(12) United States Patent
Lassuyt

(10) Patent No.: US 11,190,116 B2
(45) Date of Patent: Nov. 30, 2021

(54) TEXTILE MACHINE

(71) Applicant: VANDEWIELE NV, Kortrijk/Marke (BE)

(72) Inventor: Wim Lassuyt, Beselare (BE)

(73) Assignee: VANDEWIELE NV, Kortrijk/Marke (BE)

( * ) Notice: Subject to any disclaimer, the term of this patent is extended or adjusted under 35 U.S.C. 154(b) by 0 days.

(21) Appl. No.: 16/753,368

(22) PCT Filed: Sep. 26, 2018

(86) PCT No.: PCT/EP2018/076037
§ 371 (c)(1),
(2) Date: Apr. 3, 2020

(87) PCT Pub. No.: WO2019/072551
PCT Pub. Date: Apr. 18, 2019

(65) Prior Publication Data
US 2020/0274466 A1    Aug. 27, 2020

(30) Foreign Application Priority Data

Oct. 12, 2017    (EP) .................................... 17196093

(51) Int. Cl.
*H02P 5/747*    (2006.01)
*D03D 51/02*    (2006.01)
*D05C 15/08*    (2006.01)

(52) U.S. Cl.
CPC ............ *H02P 5/747* (2013.01); *D03D 51/02* (2013.01); *D05C 15/08* (2013.01)

(58) Field of Classification Search
CPC ......... H02P 5/74; H02P 29/025; D03D 51/02; D05C 15/08
See application file for complete search history.

(56) References Cited

U.S. PATENT DOCUMENTS

| 4,829,917 A * | 5/1989 | Morgante ............... D05C 15/30 |
|  |  | 112/80.41 |
| 5,005,498 A | 4/1991 | Taylor |

(Continued)

FOREIGN PATENT DOCUMENTS

| EP | 0942081 | 9/1999 |
| EP | 2192681 | 6/2010 |

(Continued)

OTHER PUBLICATIONS

International Search Report filed in PCT/EP2018/076037 dated Jul. 11, 2018.

*Primary Examiner* — Said Bouziane
(74) *Attorney, Agent, or Firm* — Rankin, Hill & Clark LLP

(57) ABSTRACT

A textile machine includes a main driven system driven by a plurality of main motors, a plurality of slave driven systems each driven by at least one slave motor, and an energy supply/control arrangement for supplying energy to the main motors and the slave motors and for controlling the flow of energy between a power supply system and the main motors and the slave motors. The energy supply/control arrangement includes a first energy exchange unit, a first main motor unit, a second energy exchange unit, a second main motor unit, and a controller. The slave motors include at least one first slave motor connected to a first DC voltage bus system by an associated first slave motor unit and at least one second slave motor connected to a second DC voltage bus system by an associated second slave motor unit.

17 Claims, 3 Drawing Sheets

(56) References Cited

U.S. PATENT DOCUMENTS

| | | | | |
|---|---|---|---|---|
| 5,979,344 A | * | 11/1999 | Christman, Jr. ....... | D05C 15/16 112/80.23 |
| 6,283,053 B1 | * | 9/2001 | Morgante ............... | D05C 15/18 112/220 |
| 6,834,601 B2 | * | 12/2004 | Card ...................... | D05C 15/34 112/80.23 |

FOREIGN PATENT DOCUMENTS

| | | |
|---|---|---|
| WO | 02067402 | 8/2002 |
| WO | 2009036755 | 3/2009 |
| WO | 2017081528 | 5/2017 |

* cited by examiner

TEXTILE MACHINE

The present invention relates to a textile machine, for example a weaving machine, comprising a main driven system and a plurality of slave driven systems.

WO 2017/081528 A1 discloses a power control system of a textile machine for controlling the flow of energy to and from a plurality of motors. One of the motors constituting a main motor is provided for driving a main driven system which is the system of the textile machine having the highest inertia of all the driven systems. The other driven system can be considered as being slave driven systems, each one being driven by a separate slave motor in a controlled relationship with respect to the operation of the main driven system and the main motor driving the main driven system, respectively.

An energy exchange unit is provided in this known system for transforming an AC voltage supplied by a power supply system, for example the mains or any kind of power plant, into a DC voltage supplied to a DC voltage bus system. In association with the main motor and in association with each slave motor, a respective motor unit is provided for connecting the main motor as well as the slave motors to the DC voltage bus system and thereby applying a respective drive voltage to each one of these motors. The main motor can be operated in an energy recovery mode for supplying energy to the DC voltage bus system via the main motor unit. The energy fed back into the DC voltage bus system by energy harvesting, for example, can be used in the event of a failure or a breakdown of the power supply system for providing sufficient energy for driving the slave driven systems via the associated slave motors for bringing all these slave driven systems as well as the main driven system to a controlled stand still.

It is the object of the present invention, to provide a textile machine, in particular a weaving machine or a tufting machine, having an enhanced drive system for driving the various driven systems thereof as well as an enhanced system for exchanging energy between the various driven systems and/or between these systems and a power supply system.

According to the present invention this object is achieved by a textile machine, comprising:
- a main driven system driven by a plurality of main motors mechanically coupled to each other by means of the main driven system and/or for driving the main driven system,
- a plurality of slave driven systems, each slave driven system being driven by at least one slave motor,
- an energy supply/control arrangement for supplying energy to the main motors and the slave motors and for controlling the flow of energy between a power supply system and the main motors and the slave motors,
- the energy supply/control arrangement comprising:
- a first energy exchange unit for exchanging energy between the power supply system and a first DC voltage bus system,
- a first main motor unit connecting a first one of the main motors to the first DC voltage bus system for applying a drive voltage to the first main motor,
- a second energy exchange unit for exchanging energy between the power supply system and a second DC voltage bus system,
- a second main motor unit connecting a second one of the main motors to the second DC voltage bus system for applying a drive voltage to the second main motor,
- a controller controlling the first main motor unit for applying the drive voltage to the first main motor and controlling the second main motor unit for applying the drive voltage to the second main motor,
- the slave motors comprising at least one first slave motor connected to the first DC voltage bus system by means of an associated first slave motor unit for applying a drive voltage to the first slave motor, and comprising at least one second slave motor connected to the second DC voltage bus system by means of an associated second slave motor unit for applying a drive voltage to the second slave motor.

According to the principle of the present invention, there are provided a plurality of main motors driving the main driven system. This allows the introduction of the driving torque of these main motors at different locations into the main driven system. Due to this, an enhanced distribution of the mechanical load acting on the various torque transmitting components of the main driven system can be achieved. Further, due to the use of separate energy exchange units in association with each main motor and each main motor unit associated with such a main motor, respectively, the energy exchange of each part of the energy supply/control arrangement comprising one energy exchange unit, one main motor and an associated main motor unit as well as a part of all the slave driven systems and the associated slave motors of the entire textile machine can be enhanced and an overload of the DC bus systems associated with each one of these parts of the entire energy supply/control arrangement can be avoided. Further, providing a plurality of such combinations of main motors and main motor units and the associated energy exchange units allows the arrangement of such energy exchange units in close proximity to the respective main motors, i.e. the locations where electric energy is consumed and/or is generated for feeding back into the respective DC voltage bus system and the power supply system, respectively. Thereby, energy losses in the lines conducting the electric energy and an overload of such lines can be avoided and optimum cables can be chosen.

It is to be noted that such a machine may have more than two main motors and, in this case, would have a corresponding higher number of energy exchange units and main motor units associated with the respective main motors. For example, such a textile machine may have three main motors, each one of these motors having associated therewith an energy exchange unit for exchanging energy between the power supply system and a respective DC voltage bus system as well as a main motor unit for connecting a respective main motor to the associated DC voltage bus system.

For ensuring a DC voltage level which is appropriate for generating the drive voltages necessary for driving the various main motors and slave motors, the first energy exchange unit may be arranged for providing a desired DC voltage in the first DC voltage bus system, and/or the second energy exchange unit may be arranged for providing a desired DC voltage in the second DC voltage bus system.

For providing a system having a low power consumption and for ensuring that excess kinetic energy of one or a plurality of the driven systems can be used for driving other driven systems, it is proposed that:
- the first main motor can be operated in an energy recovery mode for supplying energy to the first DC voltage bus system, and/or
- the second main motor can be operated in an energy recovery mode for supplying energy to the second DC voltage bus system, and/or
- at least one, preferably each first slave motor can be operated in an energy recovery mode for supplying energy to the first DC voltage bus system, and/or at least one, preferably each second slave motor can be operated in an energy recovery mode for supplying energy to the second DC voltage bus system.

For allowing the supply of excess energy present within one or both of the DC voltage bus systems back to the power supply system, the first energy exchange unit may be arranged for transferring energy from the first DC voltage bus system to the power supply system in a condition in which the first main motor and/or at least one first slave motor is operated in the energy recovery mode, and/or the second energy exchange unit may be arranged for transferring energy from the second DC voltage bus system to the power supply system in a condition in which the second main motor and/or at least one second slave motor is operated in the energy recovery mode According to a very advantageous aspect of the present invention, the first DC voltage bus system and the second DC voltage bus system are connected to each other for an energy exchange between the first DC voltage bus system and the second DC voltage bus system. This means that all the motors associated with one of the DC voltage bus systems can be supplied with electric energy from the other DC voltage bus system, and electric energy generated during energy harvesting within one of the DC voltage bus systems can be used by the motors associated with the other DC voltage bus system. This is of particular advantage in a condition in which, due to a failure or a breakdown of the energy supply in one of the DC voltage bus systems or due to a failure or a breakdown of the power supply system, a supply of at least a part of the motors with electric energy could not be ensured. By providing an electric connection between the DC voltage bus systems, the energy which is present within these interconnected DC voltage bus systems is available for each one of the motors connected to these DC voltage bus systems.

For allowing the adjustment of the DC voltage level within the connected DC voltage bus systems to a DC voltage level which is in the range of the desired DC voltage, it is proposed that the first energy exchange unit is arranged for monitoring a DC voltage in the first DC voltage bus system, and that the first energy exchange unit is arranged for controlling a current flow between the power supply system and the first DC voltage bus system via the first energy exchange unit and the second energy exchange unit is arranged for controlling a current flow between the power supply system and the second DC voltage bus system via the second energy exchange unit for adjusting the DC voltage in the first DC voltage bus system and the second DC voltage bus system in the range of the desired DC voltage. This means that only one of the energy exchange units is used for comparing the detected DC voltage with the desired DC voltage and providing information which is relevant for controlling the energy exchange between the DC voltage bus systems and the power supply system for adjusting the DC voltage of the DC voltage bus systems to the desired value or value range. The second energy exchange unit which, as is the case with the first energy exchange unit, also might have the capability of comparing this voltages and providing information about a deviation between the detected DC voltage and the desired DC voltage, but is not used for carrying out this function, for example, by deactivating this voltage comparing function. Thereby, it can be avoided that the two energy exchange units measuring the respective voltages at different locations within the entire DC voltage bus system provide different values of the deviation and, when trying to adjust the voltage, act against each other.

For example, the first energy exchange unit may be arranged for determining a deviation between the monitored DC voltage and the desired DC voltage and for inputting information relating to the deviation into the controller, and the controller may be arranged for inputting a current control information based on the deviation into the first energy exchange unit and the second energy exchange unit, and the first energy exchange unit may be arranged for controlling a current flow between the power supply system and the first DC voltage bus system on the basis of the current control information input into the first energy exchange unit, and the second energy exchange unit may be arranged for controlling a current flow between the power supply system and the second DC voltage bus system on the basis of the current control information input into the second energy exchange unit. In such a system, the controller has the function of deciding which one of the energy exchange units contributes in which extent to the energy exchange between the power supply system and the respective DC voltage supply system. Thereby, an overload of one of the energy exchange units can be avoided.

The controller may be connected to the first energy exchange unit and the second energy exchange unit by means of a data bus system, preferably a real-time deterministic data filed bus system, e.g. an EtherCAT, Profibus or Powerlink. This allows a reliable and quick and isochronous bidirectional exchange of all the necessary information between the controller and the energy exchange units providing deterministic control behavior.

In an alternative embodiment, the first energy exchange unit may be arranged for determining a deviation between the monitored DC voltage and the desired DC voltage and for inputting a current control information based on the deviation into the second energy exchange unit, and the first energy exchange unit may be arranged for controlling a current flow between the power supply system and the first DC voltage bus system on the basis of the deviation, and the second energy exchange unit may be arranged for controlling a current flow between the power supply system and the second DC voltage bus system on the basis of the current control information input into the second energy exchange unit.

For transmitting the relevant information from the first energy exchange unit to the second energy exchange unit, the first energy exchange unit may be connected to the second energy exchange unit by means of a data bus system, preferably a field bus system. This data transmitting connection may be a unidirectional connection only allowing the transfer of information from the first energy exchange unit to the second energy exchange unit and thereby excluding any possibility for deterministic control behaviour.

The controller may be connected to the first main motor unit and the second main motor unit by means of a data bus system, preferably a real-time deterministic data field bus system, e.g. an EtherCAT, Profibus or Powerlink, again allowing a quick, isochronous and reliable transfer of the relevant information between the controller and the controlled units, providing deterministic control behaviour.

For example, at least one energy exchange unit may comprise a grid connected voltage source inverter.

The main driven system of the textile machine may comprise a textile machine main shaft and/or at least one rapier drive mechanism and/or a reed drive mechanism. In a very advantageous configuration, the first main motor may be drivingly coupled to a first axial end of the textile machine main shaft and the second main motor may be drivingly coupled to a second axial end of the textile machine main shaft. Thereby, the torque load at the axial ends of the main shaft can be substantially reduced, leading to a substantially reduced risk of a torsion of this shaft and thereby allowing a substantially enhanced cooperation of all systems mechanically connected to and driven by this main shaft.

The slave driven systems may comprise at least one heddle frame drive mechanism and/or a jacquard mechanism.

Further, the main motors and/or at least one, preferably all the slave motors may be AC motors, for example permanent magnet synchronous motors or asynchronous induction motors. Alternatively, at least one of the main motors and/or at least one of the slave motors may be a reluctance motor or a switched reluctance motor.

The principles of the present invention may be applied to a weaving machine being one example of a textile machine, as well as a tufting machine being an other example of a textile machine also having a machine main shaft which, in line with the present invention, can be driven by two or more main motors.

The invention will now be explained with respect to the drawings, in which.

Figure 1:
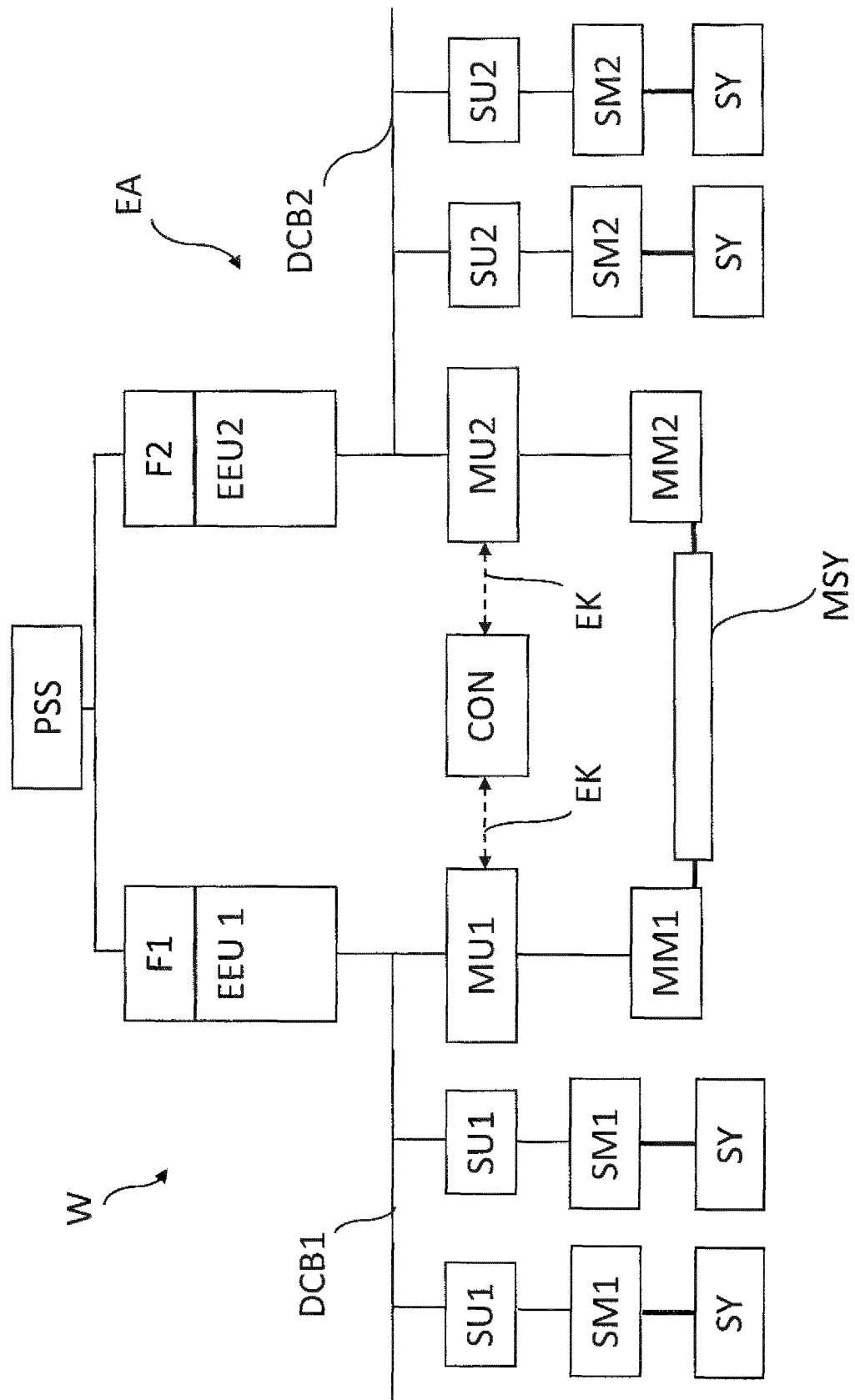
FIG. 1 is a schematic representation of a textile machine and the energy supply/control arrangement for the drive system of such a textile machine, respectively.

FIG. 1 shows a schematic representation of a textile machine, in particular a weaving machine W, having a main driven system MSY and a plurality of slave driven systems SY. In association with the main driven system MSY, two main motors MM1, MM2 are provided. These main motors MM1, MM2 are mechanically coupled to the main driven system MSY and thereby are mechanically coupled to each other. For example, the main driven system MSY may comprise a main shaft of a weaving machine, and the main motors MM1, MM2 may be coupled to the two axial ends of this main shaft for commonly driving the main shaft and all those systems of the weaving machine mechanically coupled to the main shaft for being driven thereby. For example, these systems may comprise one or a plurality of rapier mechanisms and/or a reed drive mechanism.

For supplying the main motors MM1, MM2 with electric energy provided by a power supply system PSS which, for example, may comprise the mains or any kind of power plant delivering a high AC voltage, an energy supply/control arrangement EA comprises two energy exchange units EEU1, EEU2 connected to the power supply system PSS via respective low pass filters F1, F2. Each one of these energy exchange units EEU1, EEU2 is arranged for working as an AC/DC converter or inverter, respectively, for converting the AC voltage supplied by the power supply system PSS into a DC voltage of a desired level which, for example, may be in the range of 600V to 650V. Each one of these energy exchange units EEU1, EEU2, for example, may be a so-called grid connected voltage source inverter. As will be explained later on, for stabilizing the voltage level of the DC voltage, each one of the energy exchange units EEU1, EEU2 is further arranged for working as a DC/AC converter or inverter, respectively, for feeding energy back to the power supply system PSS.

In association with each one of the two energy exchange units EEU1, EEU2, a respective DC voltage bus system DCB1, DCB2 is provided. The DC voltage bus systems DCB1, DCB2 are used for distributing electric energy provided in the form of a DC voltage of a desired level by means of the energy exchange units EEU1, EEU2 to the various driven systems and the motors used for driving these driven systems, respectively. For providing a substantially uniform load of the two DC voltage bus systems DCB1, DCB2, a first one of the two main motors MM1, MM2, i.e. first main motor MM1, is connected to the first DC voltage bus system DCB1 via a main motor unit MU1, while the other one of the two main motors MM1, MM2, i.e. second main motor MM2, is connected to the second DC voltage bus system DCB2 via a main motor unit MU2. Each one of these two main motor units MU1, MU2 is arranged for operating as a DC/AC converter for applying an AC drive voltage to the associated main motor, and is arranged for operating as an AC/DC converter in a condition, in which a respective main motor MM1, MM2 is operated in an energy recovery mode, such that by means of energy harvesting excess kinetic energy available in the main driven system MSY can be transformed into electric energy and can be supplied to the DC voltage bus systems DCB1, DCB2.

The two main motor units MU1, MU2 are under the control of a controller CON for controlling the rotational speed and the torque delivered by the two main motors MM1, MM2 for ensuring that, for example, the torques applied to the two axial ends of a main shaft of the main driven system MSY are of the same magnitude and are in phase with each other. For example, the controller CON can be in communication with an overall control system of a weaving machine for adapting the operation of the main driven system MSY to the desired weaving operation. For ensuring a quick, isochronous and reliable data transfer between the controller CON and the main motor units MU1, MU2, a data bus system, preferably a real-time deterministic data bus system, e.g. a so-called EtherCAT data bus system EK, may be used.

As can be seen in FIG. 1, in association with each DC voltage bus system DCB1, DCB2, a plurality of slave driven systems SY are provided. For example, the same number of slave driven systems SY may be associated with each one of the DC voltage bus systems DCB1, DCB2 for ensuring that, during an operation of a weaving machine, the load of both of the DC voltage bus systems DCB1, DCB2 is substantially the same. Irrespective of the number of slave driven systems SY associated with each one of the DC voltage bus systems DCB1, DCB2, the energy exchange units EEU1, EEU2 are controlled such as to provide the amount of energy for each one of the DC voltage bus systems DCB1, DCB2 necessary for operating all the systems connected thereto and providing respective variable loads.

In association with each slave driven system SY associated with the first DC voltage bus system DCB1, a first slave motor SM1 is provided and is connected to the first DC voltage bus system DCB1 via a respective first slave motor unit SU1. Correspondingly, in association with each slave driven system SY associated with the second DC voltage bus system DCB2, a second slave motor SM2 is provided and is connected to the second DC voltage bus system DCB2 via a respective second slave motor unit SU2. Each one of the first and second slave motor units SU1, SU2 can be operated as a DC/AC converter for applying an AC drive voltage to the associated slave motor, and can be operated as an AC/DC converter during an energy recovery operation of the associated slave motor for transforming excess kinetic energy available in a respective slave driven system SY into electric energy and supplying this electric energy to the respective DC voltage bus system DCB1, DCB2.

All the slave driven systems SY are driven by the associated slave motors SM1, SM2 such as to cooperate with each other and the main driven system MSY under the control of the overall control system of the textile machine. However, the slave driven systems do not have a mechanical drive connection to each other and the main driven system.

As can be seen in FIG. 1, all the motors constituting energy consumers during a drive operation and constituting energy sources during an energy recovery operation are separated into two groups, each one of these two groups being associated with one of the two DC voltage bus systems DCB1, DCB2 and, thereby, being associated with one of the two energy exchange units EEU1, EEU2. Thereby, the extent of voltage variations within each one of the DC voltage bus systems due to a variation of the load applied by the respective motors during a drive operation thereof and due to a variation of the amount of energy fed back into the respective DC voltage bus systems DCB1, DCB2 during an energy recovery operation thereof can be substantially reduced, what also leads to a reduced risk of an excessive increase or decrease of the voltage level within each one of the DC voltage bus systems DCB1, DCB2 which, possibly, could not be handled by the respective energy exchange unit EEU1, EEU2 selectively working as an AC/DC converter and as a DC/AC converter for exchanging energy between the power supply system PSS in the respective DC voltage bus system DCB1, DCB2 for keeping the DC voltage within each one of these DC voltage bus systems in the range of the desired level of, for example, about 650V.

It is to be noted that, in association with each one of the two DC voltage bus systems DCB1, DCB2, a so-called brake chopper may be provided which, in the event of an excessive increase of the DC voltage within a respective DC voltage bus system, cuts of voltage peaks exceeding a predetermined threshold voltage. However, due to splitting all the energy consumers and the energy sources, respectively, into two groups, the risk of such an overvoltage appearing is substantially reduced, also leading to a reduced energy loss due to the operation of a respective brake chopper for cutting of voltage peaks.

Figure 2:
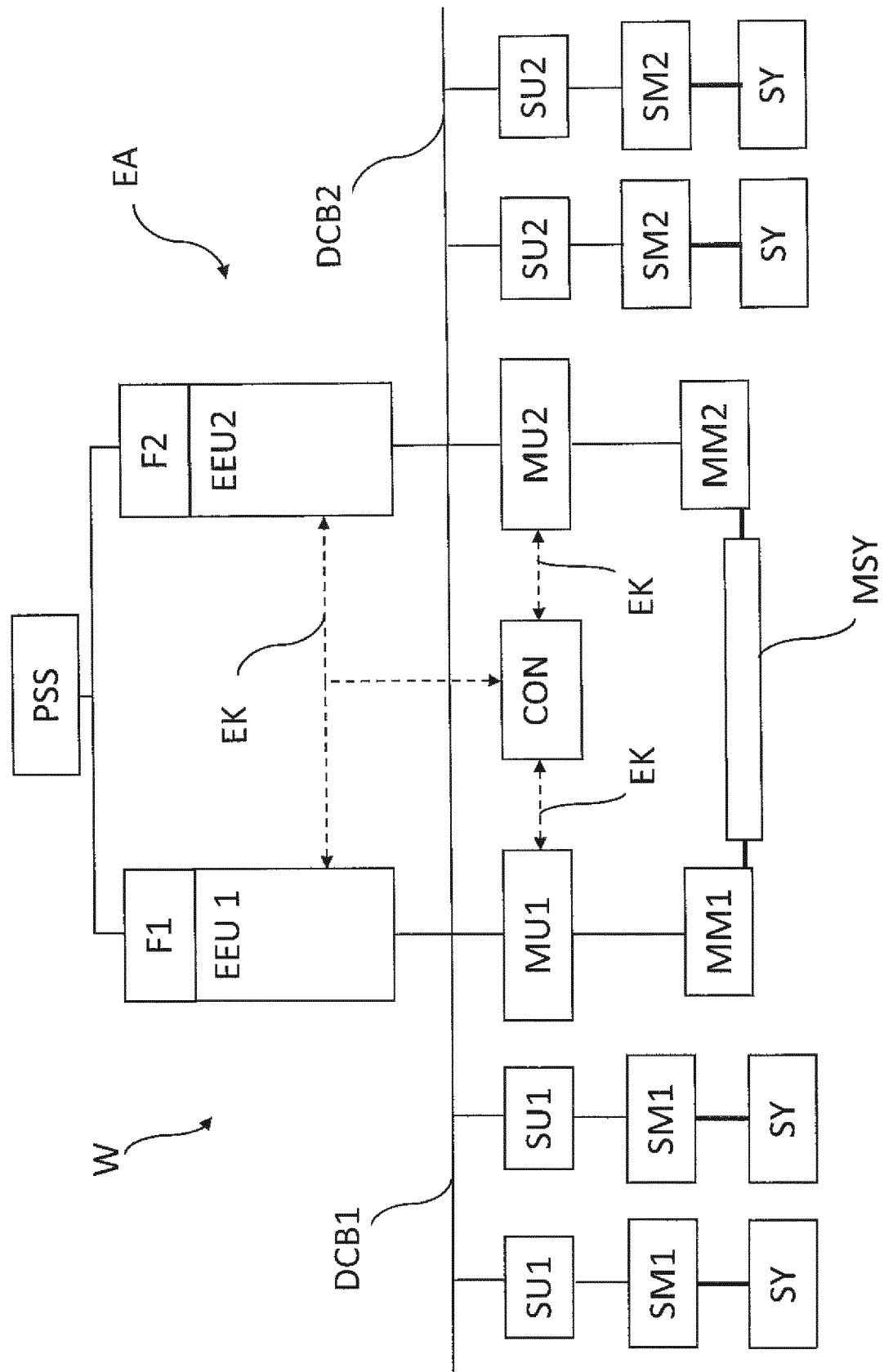
FIG. 2 is a schematic representation showing another embodiment of the energy supply/control arrangement.

FIG. 2 shows an embodiment which, in so far the association of the first and second main motors MM1, MM2 and the first and second slave motors SM1, SM2 to the respective DC voltage bus systems DCB1, DCB2 is concerned, corresponds to the one shown in FIG. 1. However, there is a substantial difference in that, what becomes clear from FIG. 2, the two DC voltage bus systems DCB1, DCB2 are connected to each other for allowing an energy exchange between these two DC voltage bus systems DCB1, DCB2. Therefore, by providing an electric connection between these two DC voltage bus systems DCB1, DCB2, an overall DC voltage bus system is generated, while the physical connection of the respective motor units and motors, respectively, to the two DC voltage bus systems DCB1, DCB2 and the physical construction thereof is maintained. Due to the electric interconnection of the two DC voltage bus systems DCB1, DCB2, there can be an energy exchange between consumers and sources of electric energy associated with different ones of the two DC voltage bus systems DCB1, DCB2. Further, the two energy exchange units EEU1, EEU2 now are arranged for working parallel to each other for exchanging energy between the power supply system PSS and the overall DC voltage bus system constituted by the two interconnected DC voltage bus systems DCB1, DCB2.

As each one of the energy exchange units EEU1, EEU2 basically has the function and the capability of controlling the DC voltage to the desired level, in the arrangement shown in FIG. 2, it will be necessary to make sure that the two energy exchange units EEU1, EEU2 do not work against each other when trying to stabilize the DC voltage at desired level. Therefore, according to the present invention, in the arrangement shown in FIG. 2, both energy exchange units EEU1, EEU2 are in communication with the controller CON, for example, via the EtherCAT data bus system EK. One of the two energy exchange units EEU1, EEU2, for example the first energy exchange unit EEU1, is arranged and is used for detecting the DC voltage within the overall DC voltage bus system, for example, in the area of the first DC voltage bus system DCB1.

The first energy exchange unit EEU1 compares this detected DC voltage to the desired DC voltage and may be arranged for determining a deviation therebetween. The first energy exchange unit EEU1 is arranged for outputting information representing this deviation to the controller CON via the EtherCAT data bus system EK. The controller CON is arranged for using this information for determining the amount of energy which has to be exchanged between the power supply system PSS and the two DC voltage bus systems DCB1, DCB2 for keeping the DC voltage in the range of the desired DC voltage. In particular, the controller CON is arranged for determining the current flow from the power supply system to the DC voltage bus systems DCB1, DCB2 or from the DC voltage bus systems DCB1, DCB2 to the power supply system PSS for avoiding an excessive decrease or increase of the DC voltage within each one of the DC voltage bus systems DCB1, DCB2. Additionally, the controller is arranged for distributing this current flow necessary for keeping the DC voltage at the desired level to the two energy exchange units EEU1, EEU2 and to send a current control information to each one of the two energy exchange units EEU1, EEU2 via the EtherCAT data bus system EK. The two energy exchange units EEU1, EEU2 are arranged for receiving this information and carrying out a current control such that, by controlling the electric current flowing between the DC voltage bus systems DCB1, DCB2 and the power supply system PSS, thereby also controlling the displacement power factor on the grid side close to 1, meaning that the energy exchange between the DC voltage bus systems DCB1, DCB2 and the power supply system PSS occurs with the highest efficiency, each one of the two energy exchange units EEU1, EEU2 contributes to keeping the DC voltage in the range of the desired DC voltage. For example, the current control information may be of such a kind that each one of the two energy exchange units EEU1, EEU2 has to bear half of the entire load of the energy exchange necessary for the DC voltage control.

While being arranged for allowing an energy exchange between the two DC voltage bus systems DCB1, DCB2 and the consumers and sources of electric energy associated with these DC voltage bus systems DCB1, DCB2, each one of the energy exchange units EEU1, EEU2 is arranged for supplying sufficient electric energy to the respective associated DC voltage bus system DCB1 or DCB2 and for feeding back electric energy from the respective associated DC voltage bus system DCB1 or DCB2 to the power supply system PSS for thereby avoiding an energy transfer between the two DC voltage bus systems DCB1, DCB2 via the lines providing the electric connection therebetween. Thereby, a permanent load of these lines and an energy loss within these lines can be avoided, and the risk of any kind of accident due to a very high current flowing over these lines during a normal operation can be substantially reduced. As the controller CON is arranged for controlling both main motor units MU1, MU2, the controller CON has information about the intended operation of the first and second main motors MM1, MM2 and, based on this information, can provide a prediction of the expected energy consumption of these main motors MM1, MM2. On the basis of this expected energy consumption, the controller CON can proactively control the energy flow into and out of the DC voltage bus systems DCB1, DCB2 by providing a feedforward control of the energy exchange units EEU1, EEU2. Due to such a feedforward control, even in an operation in which there are differently varying loads in the both DC voltage bus systems DCB1, DCB2, the energy flow between the DC voltage bus systems DCB1, DCB2 can be minimized and the voltage level within each one of the DC voltage bus systems DCB1, DCB2 can be stabilized, thereby providing an enhanced DC voltage bus control behavior, even under dynamic operation conditions of the first and second main motors MM1, MM2.

However, for example, in the event of failure or a breakdown of the power supply system, an energy transfer between the systems associated with the two DC voltage bus systems can be provided for a controlled emergency operation of the entire system and/or a controlled shutdown of the system ensuring that all the driven systems are in synchronicity with each other while reducing the speed of operation until the machine comes to a stand still. Even the failure of one of the energy exchange units allows a continued operation of the machine, at least in an emergency operation or for bringing all the systems to a stand still in a controlled manner.

In the embodiment shown in FIG. 2, the controller CON communicates with the energy exchange units EEU1, EEU2 via a data bus system allowing a bidirectional communication. Therefore, the controller CON receives feedback information from the energy exchange units EEU1, EEU2 indicative of the state of operation thereof. This means that the controller CON also gets information about a possible failure of one of the energy exchange units EEU1, EEU2, for example, for not being able to control the current flow in the commanded manner. If this happens, the controller CON may adapt the current control information and make sure that the necessary energy exchange can be provided by the other, still operable energy exchange unit. Further, in the event of a failure of the controller CON or of the line connection between the controller CON and the energy exchange units EEU1, EEU2 and/or the controller CON and the main motor units MU1, MU2, there is still at least one energy exchange unit, i.e. the first energy exchange unit EEU1, which is arranged for detecting the voltage deviation and controlling the current flow on the basis of this deviation for controlling the DC voltage to a desired value and thereby ensuring that the system can be brought to a stand still in a controlled manner.

Figure 3:
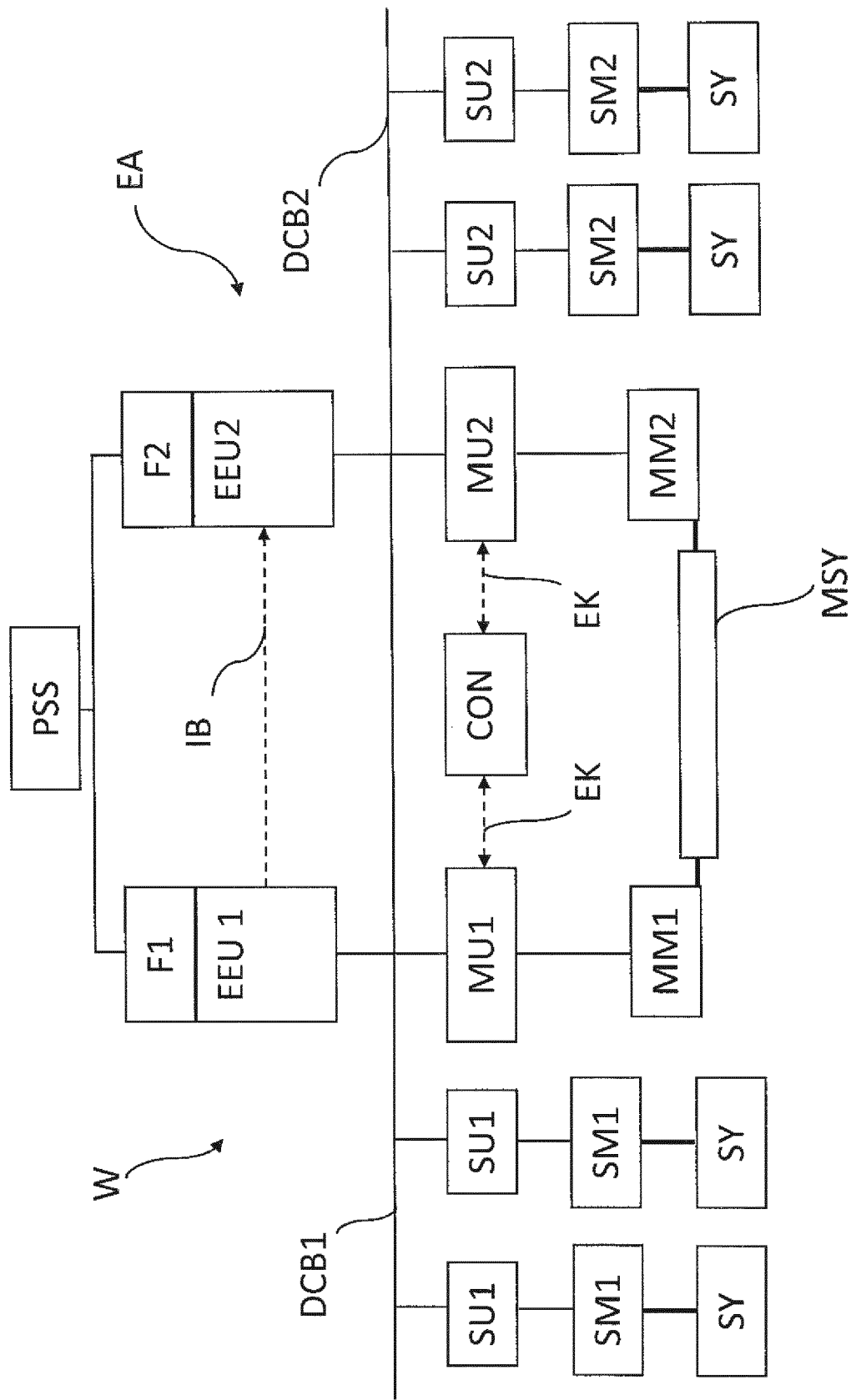
FIG. 3 is a further schematic representation showing another embodiment of the energy supply/control arrangement.

A further alternative embodiment is shown in FIG. 3. Again, the association of the various motors and the associated motor units with the two DC voltage bus systems and the energy exchange units is the same one as explained above with reference to FIG. 1.

In the arrangement of FIG. 3, the controller is not operated for controlling the distribution of the current flow necessary for keeping the DC voltage at the desired level between the two energy exchange units EEU1, EEU2 and the power supply system PSS on the basis of the voltage deviation determined, for example, by the first energy exchange unit EEU1. Instead, there is a data bus connection between these two energy exchange units EEU1, EEU2 which, for example, may be a field bus IB. This data bus connection may be arranged for a unidirectional data transfer from the first energy exchange unit EEU1 to the second energy exchange unit EEU2 for thereby providing the second energy exchange unit EEU2 with the current control information generated by the first energy exchange unit EEU1 on the basis of the voltage deviation and necessary for allowing the second energy exchange unit EEU2 to carry out the current control. In this arrangement, the controller CON is not involved in the control of the load sharing between the two energy exchange units EEU1, EEU2. Therefore, a failure of the controller CON or of a data transfer connection between the controller CON and the main motor units MU1, MU2 does not affect the capability of the energy exchange units EEU1, EEU2 for controlling the DC voltage within the DC voltage bus systems DCB1, DCB2 to the desired level, for example, for bringing the system to a stand still in a controlled manner, if there is a failure of the controller CON and/or of data transfer connection between the controller CON and the main motor units MU1, MU2.

The invention claimed is:

1. A textile machine, comprising:
    a main driven system driven by a plurality of main motors mechanically coupled to each other by the main driven system,
    a plurality of slave driven systems, each slave driven system being driven by at least one slave motor,
    an energy supply/control arrangement for supplying energy to the main motors and the slave motors and for controlling the flow of energy between a power supply system and the main motors and the slave motors,
    wherein the energy supply/control arrangement comprises:
    a first energy exchange unit for exchanging energy between the power supply system and a first DC voltage bus system,
    a first main motor unit connecting a first one of the main motors to the first DC voltage bus system for applying a drive voltage to the first main motor,
    a second energy exchange unit for exchanging energy between the power supply system and a second DC voltage bus system,
    a second main motor unit connecting a second one of the main motors to the second DC voltage bus system for applying a drive voltage to the second main motor,
    a controller controlling the first main motor unit for applying the drive voltage to the first main motor and controlling the second main motor unit for applying the drive voltage to the second main motor,
    wherein the slave motors comprise at least one first slave motor connected to the first DC voltage bus system by an associated first slave motor unit for applying a drive voltage to the first slave motor, and including at least one second slave motor connected to the second DC voltage bus system by an associated second slave motor unit for applying a drive voltage to the second slave motor.

2. The textile machine according to claim 1, wherein the first energy exchange unit is arranged for providing a desired DC voltage in the first DC voltage bus system, and/or wherein the second energy exchange unit is arranged for providing a desired DC voltage in the second DC voltage bus system.

3. The textile machine according to claim 1, wherein:
    the first main motor can be operated in an energy recovery mode for supplying energy to the first DC voltage bus system, and/or the second main motor can be operated in an energy recovery mode for supplying energy to the second DC voltage bus system, and/or at least one first slave motor can be operated in an energy recovery mode for supplying energy to the first DC voltage bus system, and/or at least one second slave motor can be operated in an energy recovery mode for supplying energy to the second DC voltage bus system.

4. The textile machine according to claim 3, wherein the first energy exchange unit is arranged for transferring energy from the first DC voltage bus system to the power supply system in a condition in which the first main motor and/or at least one first slave motor is operated in the energy recovery mode, and/or wherein the second energy exchange unit is arranged for transferring energy from the second DC voltage bus system to the power supply system in a condition in which the second main motor and/or at least one second slave motor is operated in the energy recovery mode.

5. The textile machine according to claim 1, wherein the first DC voltage bus system and the second DC voltage bus system are connected to each other for an energy exchange between the first DC voltage bus system and the second DC voltage bus system.

6. The textile machine according to claim 5, wherein the first energy exchange unit is arranged for monitoring a DC voltage in the first DC voltage bus system, and wherein the first energy exchange unit is arranged for controlling a current flow between the power supply system and the first DC voltage bus system) via the first energy exchange unit and the second energy exchange unit is arranged for controlling a current flow between the power supply system and the second DC voltage bus system via the second energy exchange unit for adjusting the DC voltage in the first DC voltage bus system and the second DC voltage bus system in the range of the desired DC voltage.

7. The textile machine according to claim 6, wherein the first energy exchange unit is arranged for determining a deviation between the monitored DC voltage and the desired DC voltage and for inputting information relating to the deviation into the controller, and wherein the controller is arranged for inputting a current control information based on the deviation into the first energy exchange unit and the second energy exchange unit, and wherein the first energy exchange unit is arranged for controlling a current flow between the power supply system and the first DC voltage bus system on the basis of the current control information input into the first energy exchange unit, and the second energy exchange unit is arranged for controlling a current flow between the power supply system and the second DC voltage bus system on the basis of the current control information input into the second energy exchange unit.

8. The textile machine according to claim 7, wherein the controller is connected to the first energy exchange unit and the second energy exchange unit by a real-time deterministic data field bus system.

9. The textile machine according to claim 6, wherein the first energy exchange unit is arranged for determining a deviation between the monitored DC voltage and the desired DC voltage and for inputting a current control information based on the deviation into the second energy exchange unit, and wherein the first energy exchange unit is arranged for controlling a current flow between the power supply system and the first DC voltage bus system on the basis of the deviation, and the second energy exchange unit is arranged for controlling a current flow between the power supply system and the second DC voltage bus system on the basis of the current control information input into the second energy exchange unit.

10. The textile machine according to claim 9, wherein the first energy exchange unit is connected to the second energy exchange unit by a field bus system.

11. The textile machine according to claim 1, wherein the controller is connected to the first main motor unit and the second main motor unit by a real-time deterministic data field bus system.

12. The textile machine according to claim 1, wherein at least one energy exchange unit comprises a grid connected voltage source inverter.

13. The textile machine according to claim 1, wherein the main driven system comprises a textile machine main shaft and/or at least one rapier drive mechanism and/or a reed drive mechanism, and the first main motor is drivingly coupled to a first axial end of the textile machine main shaft and the second main motor is drivingly coupled to a second axial end of the textile machine main shaft.

14. The textile machine according to claim 1, wherein the slave driven systems comprise at least one heddle frame drive mechanism and/or a jacquard mechanism.

15. The textile machine according to claim 1, wherein the main motors and/or at least one of the slave motors are AC motors.

16. The textile machine according to claim 1, wherein the textile machine is a weaving machine.

17. The textile machine according to claim 1, wherein the textile machine is a tufting machine.

* * * * *